UNITED STATES PATENT OFFICE.

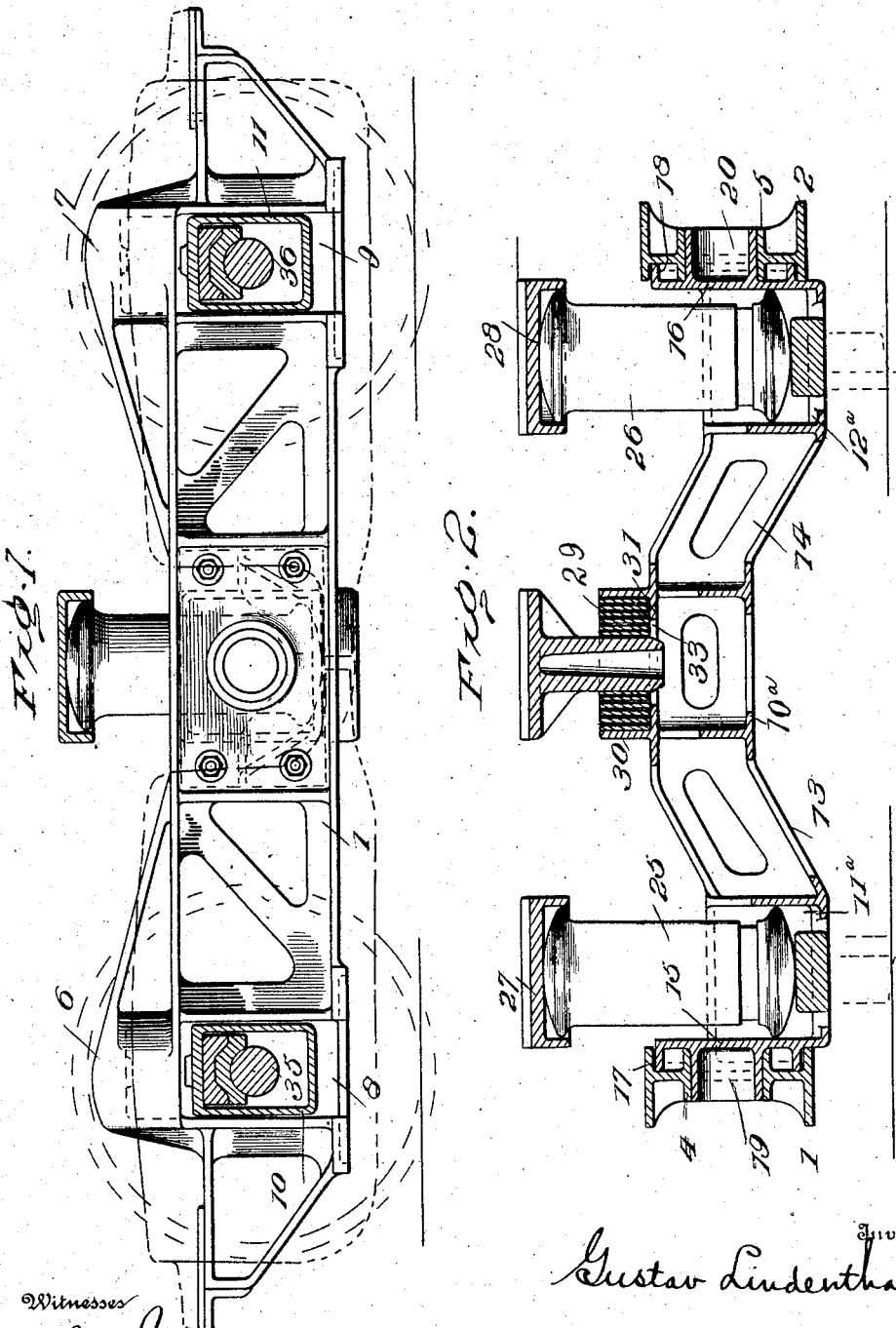

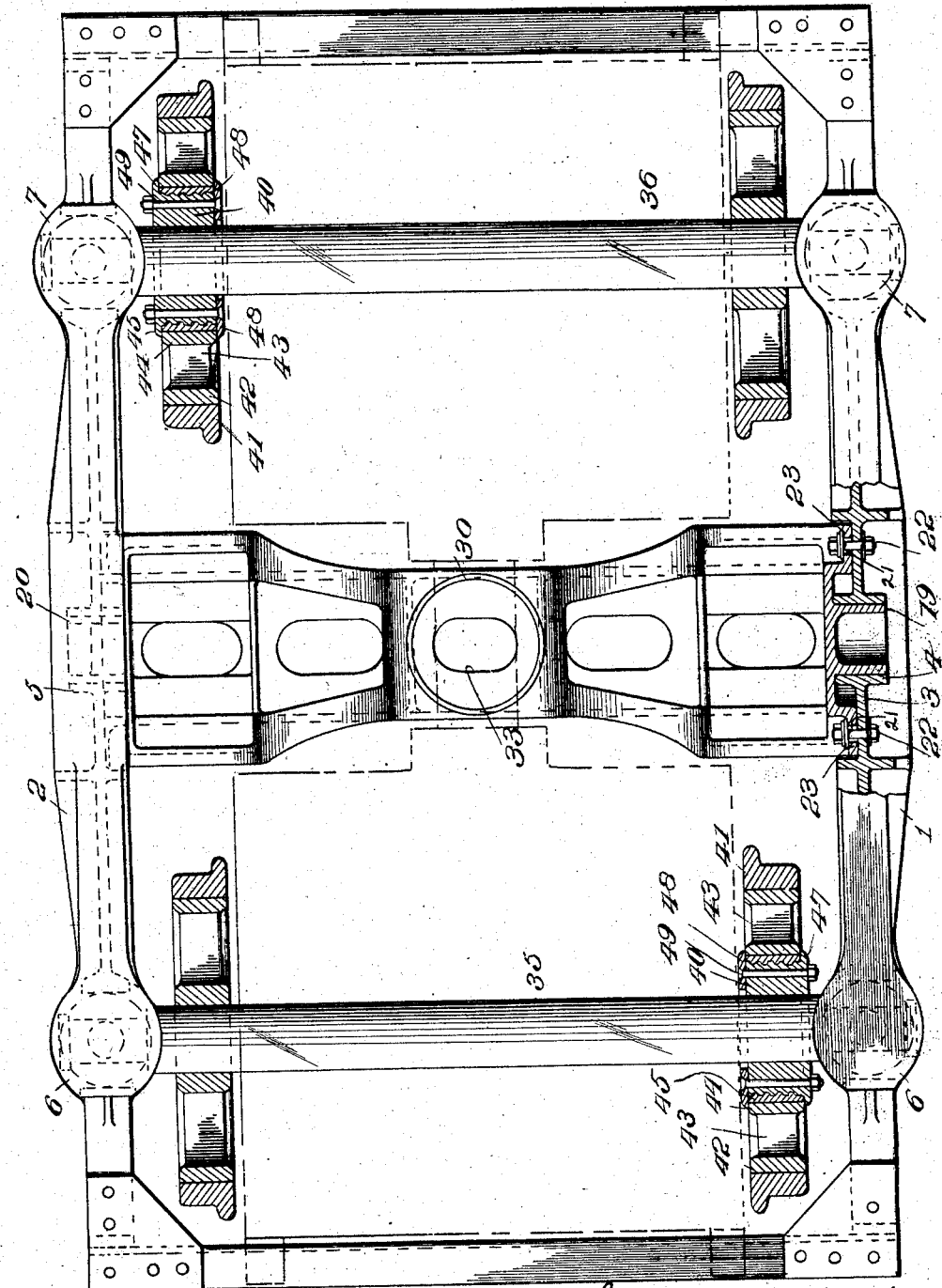

GUSTAV LINDENTHAL, OF NEW YORK, N. Y.

CAR-TRUCK EQUIPMENT.

No. 844,151.          Specification of Letters Patent.          Patented Feb. 12, 1907.

Application filed April 4, 1905. Serial No. 253,785.

*To all whom it may concern:*

Be it known that I, GUSTAV LINDENTHAL, a resident of and whose post-office address is 45 Cedar street, New York city, in the county and State of New York, have invented certain new and useful Improvements in Car-Truck Equipment, of which the following is a specification.

This invention relates to certain new and useful improvements in car-trucks and the arrangement of equipping the same.

The objects of my invention are to provide a truck of simple construction embodying some of the features set forth in my application, Serial No. 178,265, filed October 23, 1903, and to particularly adapt the novel features of said application to a side-bearing truck for electric traction-cars. I prefer to carry out these objects by employing a truck-bolster arranged to contain the side-bearing columns or rockers claimed in my aforesaid application, this truck-bolster being trunnioned onto side frames of any suitable construction, so as to permit a slight movement of one of these parts with respect to the other. In order to make this truck as thus constructed especially applicable for electric traction, I arrange each of the axles, which are of course located one on each side of the aforesaid truck-bolster, with one fixed wheel and one "loose" or movable wheel, these loose or movable wheels being arranged diagonally. In other words, the fixed wheel of one axle is on the opposite side of the truck to that on which the fixed wheel of the other axle is. I am thus enabled to use each axle as a driving-axle, as an electric motor is applied to each of the axles, and as each axle has a loose or movable wheel only the fixed wheel on each axle is available for propulsion, and as these propelling-wheels are on a diagonal line the resultant passes through the king-pin, which I prefer to make of the special construction shown in my drawings, where it will be noticed that there is a slight yielding movement between said pin and its socket formed on the truck-bolster. Other points of construction will be hereinafter set forth in detail; and the invention may therefore be said to consist of the truck and its equipment hereinafter more particularly described and then more definitely set forth by the claims at the end hereof.

In the drawings accompanying and forming part of this application, and which represent what I consider the preferable embodiment of my invention, Figure 1 is a side elevation of my improved car-truck. Fig. 2 is a vertical central section through the truck-bolster or at right angles to that shown in Fig. 1. Fig. 3 is a top plan view of the entire truck, parts being found in section in order to better illustrate the construction.

Referring now to the details of the drawings by numerals, 1 and 2 designate the two side frames of my truck, which may be formed of any construction desired, whether cast in one integral piece or made up of structural iron, but which in my drawings are formed with central bosses or hubs 4 and 5, forming sockets or bearings substantially in the center of said side frames, as clearly indicated in Figs. 2 and 3. At each end of the side frames are formed two housings 6 and 7, under which are rectangular recesses 8 and 9, within which are located the journal-boxes 10 and 11, which may be of any desired construction. I am not claiming anything new in these side frames except so far as it concerns the construction or means of connection of the side frames with the truck-bolster, and therefore the ends of these side frames need no further description or consideration. Extending from said side frames 1 and 2 entirely across the truck is a truck-bolster which is of novel configuration. I prefer to make this bolster of an integral casting, but do not confine all of my claims to an integral bolster, as other forms may well be employed. As shown in the drawings, this integral cast bolster consists of a central part 10$^a$, from which downwardly depend the dropped pockets or recesses 11$^a$ and 12$^a$, which are connected with the central part 10$^a$ by means of the diagonal portions 13 and 14, all of which are clearly shown in Fig. 2. Each of the dropped pockets 11 and 12 is formed with an outer wall 15 16, extending up above the inner wall of said dropped pockets, and these walls are flanged at 17 and 18 and are formed integral trunnions 19 and 20, which fit into the bosses or hubs 4 and 5, hereinbefore referred to as being formed on the side frames 1 and 2. The purpose of this construction is to permit slight rocking movement of the side frames with respect to the bolster, this movement occurring on the trunnions 19 and 20 in their sockets or bearings 4 and 5. It is of course necessary to provide means for holding the sockets or bearings on the trunnions and at the same time permit the rocking movement described. This may be accomplished in various ways, one of which is that illustrated in my drawings and which consists of bolts 22, which pass through perforations in the web 3 of the side frames 1 and 2 and through enlarged perforations 21 in the vertical walls 23 on the ends of the bolster.

In the dropped pockets 11 and 12 of the bolster rest elongated rockers 25 and 26, formed with spherical ends. Nothing new is claimed herein regarding these rockers, as they are claimed in prior pending applications, and as therein described the rockers receive or transmit from bearing-plates 27 and 28, secured to the car-bolster, (not shown,) all of the load, the center or king pin receiving none of the vertical weight of the car, and as shown and claimed in said applications the king-pin is permitted to have a slight lateral movement, which is absorbed or taken up by means of a spring or springs preferably contained within a socket or pocket bolted to the truck-bolster. This same idea is illustrated in this application, and to accommodate the spring 29 I employ a pocket formed of a circular wall 30, cast in the top of the bolster, this pocket, the bolster, the dropped pockets, trunnions, &c., being formed of one integral casting before referred to. The bottom wall 31 of the socket for the spring is formed with an opening 33, which is elongated, as shown in Fig. 3, the length of the opening running parallel with the length of the bolster, and as the king-pin enters said opening any extraordinary lateral shock is received and transmitted by the king-pin against the walls of the pocket of the bolster. The reason for making the opening 33 elongated at right angles to the length of the car is to enable the spring to have a greater yielding movement laterally or transversely with the car when the same enters a curve on the track.

I have before referred to the fact that the journal-boxes 10 and 11 are provided at each end of each of the side frames 1 and 2, and these boxes afford bearings for the wheel-axles 35 and 36. In the embodiment of my invention I prefer for electric traction I employ each of these axles as a driving-axle, and hence provide an electric motor for each axle. These motors are illustrated in conventional form in dotted lines in Fig. 3, and the inner ends of said motors may pass under the truck-bolster, owing to the fact that the central part 10$^a$ thereof is elevated or raised, as illustrated in Fig. 2, and instead of fixedly securing each pair of wheels to its respective axle, as is now the common practice, I arrange each axle with one of its wheels loose or movable, and instead of having both of these loose or movable wheels on the same side of the trucks I arrange the loose wheel of one axle on the opposite side to which the loose or movable wheel is secured to the other axle, so that they may be said to be located "diagonally" with the resultant passing through the king-pivot and the spring-socket hereinbefore referred to. The practical result of this arrangement is that the loose or movable wheel will turn independently of the fixed wheel on the same axle whenever the two wheels travel at different speeds, as when the car is taking a curve. It is of course well known that when both wheels are fixed on the axle one or the other of the wheels must slip in going around a curve, which produces excessive wear of the wheel-flanges on the rails. While any loose wheel may be used, I prefer to use that illustrated in Fig. 3 of my drawings, which may be described as follows: The wheel is preferably provided with a hub 40, of cast-iron or cast-steel, which is shrunk or pushed onto the axle in the usual manner. The cast-steel tire 41 may be provided with integral spokes, or it may be shrunk or otherwise secured onto a rim 42, formed with spokes 43, at the inner end of which is an inner ring 44. Between the hub 40 and this inner ring 44 is a thin layer of white metal, which may be put in place by laying the hub and the wheel down horizontally, carefully centering the parts, and then pouring the white metal into the joint between the hub and the ring. This white metal is designated by the numeral 45 and will adhere to the hub, because of the roughened surface of the circumference thereof, but will not adhere to the smooth and accurately-turned surface of the ring 44. Before pouring in the white metal it is of course preferable that the turned or machined surface of the ring 44 be painted with graphite or similar material, as is usual in the art of foundry-work, where it is desirable to prevent adherence between two materials. The hub has a projecting lip 47 to prevent the movable part of the wheel from coming loose, and after the white metal is poured into place a steel ring 48 is placed over the joint and fastened into place with bolts 49.

With a wheel such as just described the ring and outer parts will turn around the hub on the white-metal bearing only when the adhesion between the wheel and rail is greater than between the white metal and the movable ring 44.

The detailed description of my invention has been given with such attention to detail that it is believed the operation will be manifest to any one skilled in the art, and it will therefore suffice to state that I have produced a car-truck and equipment therefor which permits the truck to adjust itself to a winding surface on the rails or to uneven surfaces, owing to the trunnion-bearings between the side frames and the truck-bolster, and as the driving-wheels are arranged diagonally, as described, and as a motor is provided for each axle the wheels may have different velocities, which is necessary for a truck in rounding a curve. I deem this arrangement as important, especially when used in connection with my spherical-ended rockers, and the pivot-pin having a yielding or spring connection with the car-bolster.

It is manifest that changes may be made without departing from the spirit of my invention which is clearly set forth by the appended claims.

What I claim as new is—

1. In car-truck equipment, the combination of side frames, a bolster connecting said frames, said connection comprising a trunnion on one of said parts and a bearing on the other, a king-pin having a yielding connection with said bolster, a pair of axles supporting said side frames, and a fixed and a "loose" or movable wheel on each axle, whereby there is one fixed wheel and one "loose" or movable wheel on each side of the truck.

2. In car-truck equipment, the combination of side frames, a bolster connecting said frames, said connection comprising a trunnion on one of said parts and a bearing on the other, said bolster being provided with a socket for the king-pin, a spring within said socket, a pair of axles supporting said side frames, and a fixed and a "loose" or movable wheel on each axle, said wheels being arranged "diagonally" with the resultant passing through the spring-socket.

3. In car-truck equipment, the combination of a truck having a pair of axles, a fixed wheel and a "loose" or movable wheel on each axle, said truck having a socket for the king-pin, and a spring within said socket, said wheels being arranged "diagonally" with the resultant passing through the spring-socket.

4. In car-truck equipment, the combination of a pair of side frames, a bolster having dropped pockets or recesses therein, side-bearing columns resting in said pockets and adapted to support the truck-bolster and to freely rock upon their ends as the truck turns, a fixed wheel and a "loose" or movable wheel on each axle, said truck having a socket for the king-pin, and a spring within said socket, said wheel being arranged diagonally with the resultant passing through the spring-socket.

Signed by me at New York city this 1st day of April, 1905.

GUSTAV LINDENTHAL.

Witnesses:
 THOMAS HOGAN,
 M. B. SANFORD.